Patented May 3, 1927.

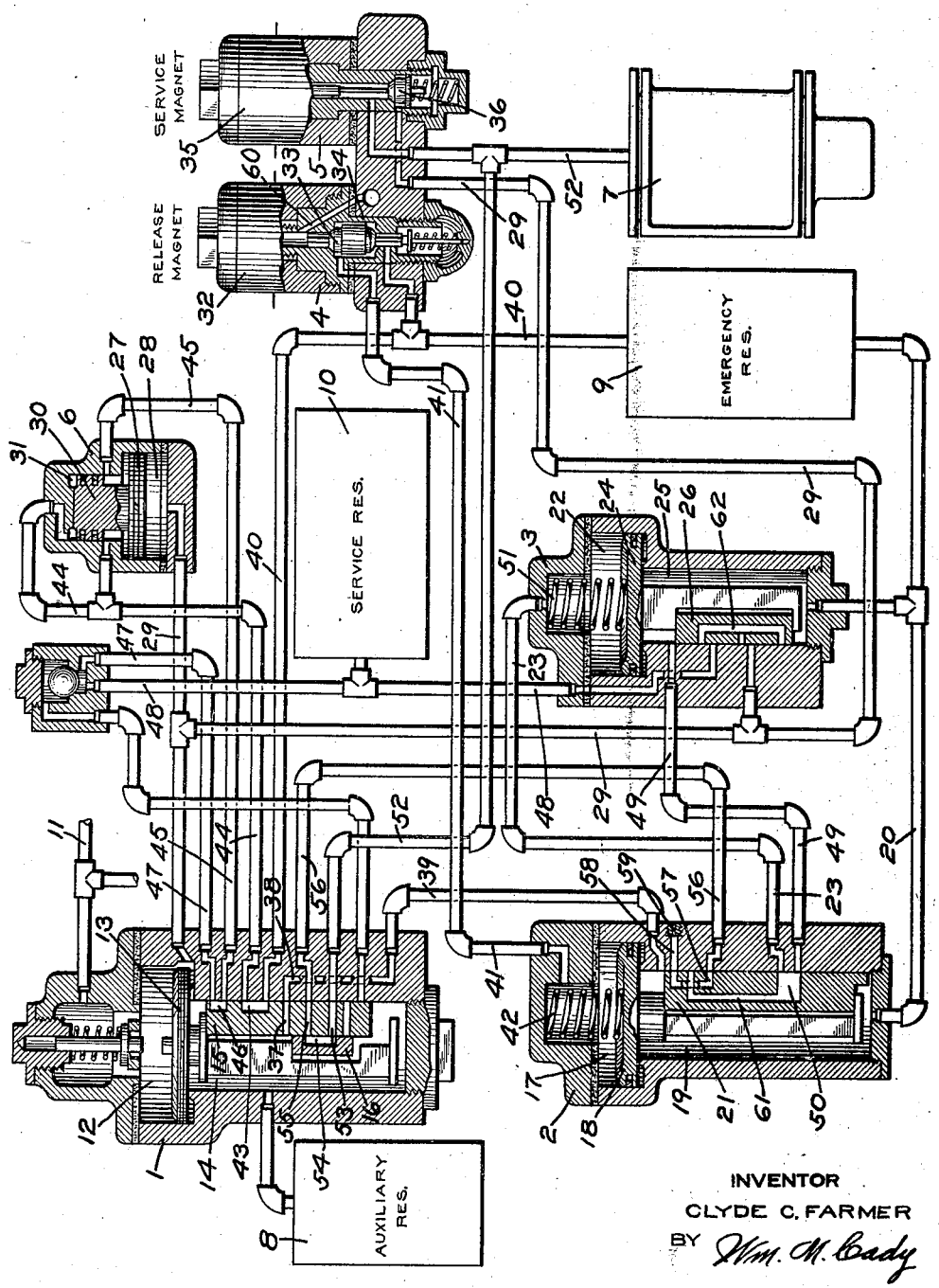

1,626,605

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed June 5, 1926. Serial No. 113,914.

This invention relates to fluid pressure brakes and more particularly to an electrically controlled fluid pressure brake.

It has heretofore been proposed to provide an electro-pneumatic brake equipment in which the movement of the brake controlling handle to brake application position sets up electrical connections to electro-magnets whereby valves are operated to supply fluid under pressure to the brake cylinder. By the same movement of the handle, the brake pipe pressure is reduced on the equalizing or triple valve devices in the train, but since the fluid supplied by electric operation is taken from the auxiliary reservoir the opposing pressures on the triple valve piston are reduced simultaneously and the triple valve device does not move to application position. If, however, the electric control should fail, then the reduction in brake pipe pressure is effective to cause the movement of the triple valve device to application position, so that an application of the brakes, pneumatically initiated, is obtained.

In order to provide for graduated release and also a source of fluid under pressure for effecting an emergency application of the brakes, a normally charged emergency reservoir is employed. When the brakes are operated pneumatically, and the brake pipe pressure is increased to effect a graduated release of the brakes, the triple valve device is moved to release position, in which the emergency reservoir is connected to the auxiliary reservoir side of the triple valve piston. The increase in pressure thus effected on the auxiliary reservoir side of the piston, causes movement of the piston to graduated release lap position.

When electrically applying the brakes, means are provided for cutting off communication from the emergency reservoir to the auxiliary reservoir side of the triple valve device, and when the brakes are electrically released, said reservoir is again connected to the auxiliary reservoir. The auxiliary reservoir pressure having been reduced when the electrically controlled brake application is effected and the auxiliary reservoir volume being relatively small, the pressure on the auxiliary reservoir side of the triple valve piston is suddenly increased, and although on cars at the head end of the train, the increase in brake pipe pressure is sufficient to substantially correspond with the increase in auxiliary reservoir pressure, on the rear cars, say in trains of 12 or more cars, the increase in brake pipe pressure will not be at a rate equal to the rate at which the auxiliary reservoir pressure will be built up by flow from the emergency reservoir, with the result that the triple valve devices at the rear of the train will tend to graduate the release of the brakes, while the brakes at the head end of the train will be directly released.

The principal object of my invention is to provide means for eliminating the tendency of the triple valve devices to graduate the release of the brakes under the above described conditions.

For accomplishing this purpose, I provide an additional reservoir, or utilize the so-called service reservoir, heretofore employed, and means whereby said reservoir is connected to the auxiliary reservoir when the brakes are electrically released, so that when the emergency reservoir is vented to the auxiliary reservoir, the pressure must be raised in the additional reservoir as well as the auxiliary reservoir, and the combined volumes of the auxiliary reservoir and the additional reservoir are such that the rise in auxiliary reservoir pressure will be slow enough to prevent possible movement of the triple valve devices from release position, when the brakes are electrically released.

In the accompanying drawing, the single figure is a diagrammatic view, partly in section, of an electro-pneumatic brake equipment embodying my invention.

The equipment shown comprises a triple valve device 1, a relay valve device 2, a by-pass valve device 3, a release magnet valve device 4, a service application magnet valve device 5, a service reservoir charging valve device 6, a brake cylinder 7, an auxiliary reservoir 8, an emergency reservoir 9. a service reservoir 10, and a brake pipe 11.

The triple valve device 1 may comprise a casing having a piston chamber 12 connected to the brake pipe 11 and containing piston 13 and a valve chamber 14 connected to the auxiliary reservoir 8 and containing a main slide valve 15 and an auxiliary slide valve 16 adapted to be operated by piston 13.

The relay valve device 2 may comprise a casing having a piston chamber 17 containing a piston 18 and a valve chamber 19 connected by pipe 20 to the emergency reservoir 9 and containing a slide valve 21 adapted to be operated by piston 18.

The by-pass valve device 3 may comprise a casing having a piston chamber 22, having a pipe 23 leading to the seat of slide valve 21 and containing a piston 24 and having a valve chamber 25 connected to emergency reservoir pipe 20 and containing a slide valve 26 adapted to be operated by piston 24.

The charging valve device 6 may comprise a casing containing a differential piston having a large piston head 27 contained in piston chamber 28, which is connected by pipe 29 to the triple valve chamber 14, and a small piston head 30 contained in piston chamber 31.

The release magnet valve device 4 may comprise an electro-magnet 32 and double beat valves 33 and 34 adapted to be controlled by said magnet and the service application magnet valve device 5 may comprise an electro-magnet 35 and a valve 36 adapted to be operated by said magnet.

While not shown, it will be understood that a combined brake valve and brake switch is employed having a release position in which the brake pipe pressure is maintained in the usual manner and in which electrical connections are made for electrically releasing the brakes and having a service application position in which fluid under pressure is vented from the brake pipe in the usual manner and in which electrical connections are made whereby an electrically controlled service application of the brakes is effected.

In operation, with the combined brake valve and brake switch in release position, fluid under pressure is supplied to the brake pipe 11 and flows to the triple valve piston chamber 12 and thence through the usual feed groove around the triple valve piston 13 to valve chamber 14, charging said chamber and the auxiliary reservoir 8 in the usual manner.

Fluid also flows from valve chamber 14 through pipe 29 to piston chamber 28 and causes piston head 27 to be shifted to its upper position, as shown in the drawing. In release position, a port 37 in slide valve 15 is uncovered by the graduating valve 16 and registers with a passage 38 which is connected to a pipe 39, leading to valve chamber 19. The valve chamber 19 of the relay valve device 2 is thus charged with fluid under pressure, and since the emergency reservoir 9 is connected through pipe 20 to said chamber, said reservoir is also charged.

In the release position of the combined brake valve and brake switch, the release magnet 32 is deenergized, so that the valve 33 is permitted to seat and the valve 34 is unseated. Communication is thereupon established from the emergency reservoir 9 to the piston chamber 17, from pipe 40 past the valve 34 to pipe 41, which leads to piston chamber 17. The fluid pressures being thus balanced, the piston 18 is maintained in the lower position, as shown in the drawing, by spring 42.

The emergency reservoir pipe 40 is also connected through a cavity 43 in slide valve 15, with a pipe 44 which leads to piston chamber 31 of the charging valve device 6 and also to the space intermediate the piston heads 27 and 30 and said space is also connected, in this position, with service reservoir 10, through pipe 45, cavity 46 in slide valve 15, pipe 47, and pipe 48, so that the service reservoir is charged with fluid under pressure.

With the relay slide valve 21 in its lower position, as shown in the drawing, valve chamber 25 of the by-pass valve device 3 is connected to piston chamber 22, through pipe 49, cavity 50 in slide valve 21 and pipe 23. The fluid pressures being thus balanced on opposite sides of piston 24, the spring 51 maintains said piston in its lower position, as shown in the drawing.

With the parts in the positions as above described, the brake cylinder 7 is connected to the exhaust, through pipe 52, port 53 in triple slide valve 15, cavity 54 in the graduating slide valve 16, port 55, pipe 56, cavity 57 in relay slide valve 21 and passage 58 having a restricted atmospheric outlet 59.

If it is desired to effect a service application of the brakes, the combined brake valve and brake switch is turned to service application position, in which the brake pipe pressure is reduced in the normal manner and in which both the release magnet 32 and the service magnet 35 are energized.

The energization of the release magnet 32 operates to seat the valve 34, so that flow of fluid from the emergency reservoir to the piston chamber 17 is cut off and to unseat the valve 33, so that fluid is vented from piston chamber 17, through pipe 41, to exhaust port 60.

The fluid pressure in piston chamber 17 being thus reduced, piston 18 is shifted to its outer position, in which slide valve 21 connects pipe 23 through cavity 61 with exhaust passage 58. Fluid is thereupon vented from piston chamber 22 of the by-pass valve device and piston 24 is thus shifted to its outer position, in which a cavity 62 in slide valve 26 connects pipe 29, leading to the auxiliary reservoir, through pipe 29, with pipe 48, leading to the service reservoir 10. Cavity 62 also connects with pipe 49.

The service magnet 35 being energized, the valve 36 is unseated and permits fluid under pressure to flow from pipe and the auxiliary reservoir to pipe 52 and the brake cylinder 7, thus effecting an application of the brakes. Since the service reservoir is connected to the auxiliary reservoir by operation of the by-pass valve device 3, the pressure in the service reservoir will be reduced with that in the auxiliary reservoir by flow to the brake cylinder.

When it is desired to release the brakes, the combined brake valve and brake switch is turned to release position, in which fluid under pressure is supplied to the brake pipe and in which the release magnet 32 and the service magnet 35 are deenergized. The deenergization of the service magnet permits the valve 36 to seat and cut off communication from supply pipe 29 to the brake cylinder 7, and the deenergization of release magnet 32 causes the valve 33 to seat and the valve 34 to unseat. When valve 34 is unseated, fluid under pressure is supplied from the emergency reservoir 9 to the piston chamber 17 and piston 18 is then shifted to its lower position, in which the brake cylinder 7 is connected to the exhaust passage 58, as hereinbefore described. Pipe 23 is also connected through cavity 50 with pipe 49 and with piston 24 in its upper position, pipe 49 is connected through cavity 62 in slide valve 26 with the auxiliary reservoir pipe 29 and the service reservoir pipe 48. Fluid from said reservoir is therefore supplied to piston chamber 22. The fluid pressure in valve chamber 25 is that of the emergency reservoir 9, which is not disturbed in making a service application of the brakes, while the fluid pressure supplied from the auxiliary reservoir and the service reservoir was reduced in making a service application of the brakes. Since the fluid pressure in piston chamber 22 is at this time less than that in the valve chamber 25, as above pointed out, the piston 24 will remain in its upper position, connecting the service reservoir 10 with the auxiliary reservoir. The result is, that although in moving to its lower position, the slide valve 21 operates to open communication from valve chamber 19 and the emergency reservoir 9 through pipe 39 to the valve chamber 14 of the triple valve device, the fluid pressure from the emergency reservoir must equalize into the service reservoir as well as the auxiliary reservoir and consequently, there will not be such a rate of increase in auxiliary reservoir pressure as to cause the possible movement of the triple valve piston from release position.

The pressure of fluid in the emergency reservoir 9 will gradually fall due to flow of fluid to the auxiliary reservoir and the service reservoir, while the pressure of fluid in the auxiliary reservoir and the service reservoir will gradually increase until a balance is reached such that the spring 51 will act to force the piston 24 to its lower position. Such movement, however, will not occur until the rate of flow from the emergency reservoir to the auxiliary reservoir has reduced to such an extent as to ensure that the auxiliary reservoir pressure will not be increased faster than the brake pipe pressure is increased.

Upon movement of piston 24 to its lower position, communication between the auxiliary reservoir and the service reservoir is cut off and pipe 49 is again connected to valve chamber 25 and the emergency reservoir 9, so that fluid at emergency reservoir pressure is supplied through cavity 50 in slide valve 21 and pipe 23 to piston chamber 22, thus ensuring that piston 24 will be maintained in its lower position by spring 51.

Having now described my invention, what I claim as new and desire to secure by Letters Patent, is:—

1. In an electro-pneumatic brake, the combination with reservoirs one, two, and three, normally charged with fluid under pressure and a brake cylinder, of electrically controlled means operating in applying the brakes to connect reservoir one to the brake cylinder and to connect reservoir two to reservoir one and in releasing the brakes to connect reservoir three to reservoir one and upon substantial equalization of reservoir three into reservoirs one and two, to cut off communication between reservoirs one and two.

2. In an electro-pneumatic brake, the combination with an auxiliary reservoir, a service reservoir, and an emergency reservoir normally charged with fluid under pressure and a brake cylinder, of electrically controlled means operated in applying the brakes to connect the service reservoir with the auxiliary reservoir and both of said reservoirs to the brake cylinder, and in releasing the brakes to first connect the emergency reservoir with the auxiliary reservoir and then to cut off communication between the auxiliary reservoir and the service reservoir.

3. In an electro-pneumatic brake, the combination with an auxiliary reservoir, a service reservoir and an additional reservoir normally charged with fluid under pressure and a brake cylinder, of a by-pass valve device having a position for connecting the service reservoir to the auxiliary reservoir, a relay valve device having a position for connecting the additional reservoir to the auxiliary reservoir and another position for effecting the operation of said by-pass valve device, and electrically controlled means operating in applying the brakes to effect the operation of said relay valve device and to connect the auxiliary reservoir to the brake cylinder.

4. In an electro-pneumatic brake, the combination with an auxiliary reservoir, a service reservoir and an additional reservoir normally charged with fluid under pressure and a brake cylinder, of a by-pass valve device comprising a piston subject on one side to fluid under pressure from the additional reservoir and a valve operated by said piston and having one position in which the auxiliary reservoir is connected to the service reservoir and to a pipe, a relay valve device having one position for connecting the additional reservoir to the auxiliary reservoir and said pipe to the other side of said piston, and another position for venting fluid from said piston, and electrically controlled means for controlling the operation of said relay valve device and the supply of fluid from the auxiliary reservoir to the brake cylinder.

5. In an electro-pneumatic brake, the combination with an auxiliary reservoir, a service reservoir, and an emergency reservoir normally charged with fluid under pressure and a brake cylinder, of electrically controlled means operating in applying the brakes to supply fluid from the auxiliary reservoir and the service reservoir to the brake cylinder and in releasing the brakes to connect the emergency reservoir to the auxiliary reservoir and temporarily maintain connection between the auxiliary reservoir and the service reservoir.

In testimony whereof I have hereunto set my hand.

CLYDE C. FARMER.